(No Model.) 2 Sheets—Sheet 1.

W. DUNN.
HOLD BACK FOR VEHICLES.

No. 487,828. Patented Dec. 13, 1892.

WITNESSES:
Herbert Blossom.
Peter A. Ross

INVENTOR:
William Dunn.
By Henry Connett
Attorney.

(No Model.) 2 Sheets—Sheet 2.
W. DUNN.
HOLD BACK FOR VEHICLES.

No. 487,828. Patented Dec. 13, 1892.

WITNESSES:
Herbert Blossom
Peter A. Ross

INVENTOR:
William Dunn
By Henry Connett
Attorney.

UNITED STATES PATENT OFFICE.

WILLIAM DUNN, OF NEW YORK, N. Y.

HOLDBACK FOR VEHICLES.

SPECIFICATION forming part of Letters Patent No. 487,828, dated December 13, 1892.

Application filed March 17, 1892. Serial No. 425,219. (No model.)

*To all whom it may concern:*

Be it known that I, WILLIAM DUNN, a subject of the Queen of Great Britain, and a resident of New York city, New York, have invented certain Improvements in Holdbacks for Vehicles and Harness, of which the following is a specification.

My invention relates to holdbacks for vehicles of the class wherein a slide-casing is mounted on the thill of the vehicle and adapted to be engaged by a part secured to the breeching-strap of the harness; and the object is in part to provide means whereby the breeching may be conveniently and readily adjusted as to length through the medium of the holdback and in part to provide means for sustaining the latch of the holdback in its two positions, all as will be more specifically set forth hereinafter.

The novel feature of my invention will be carefully defined in the claims.

Figure 1:
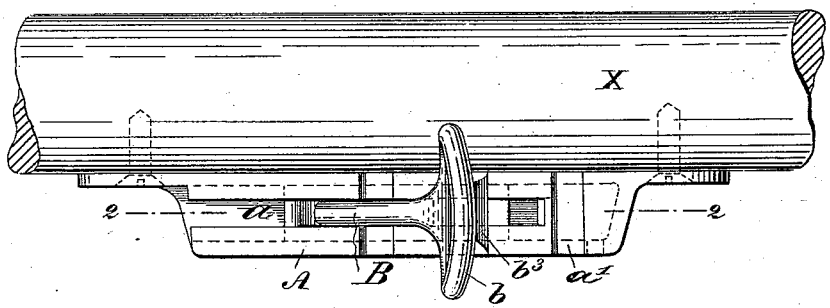
Figure 2:
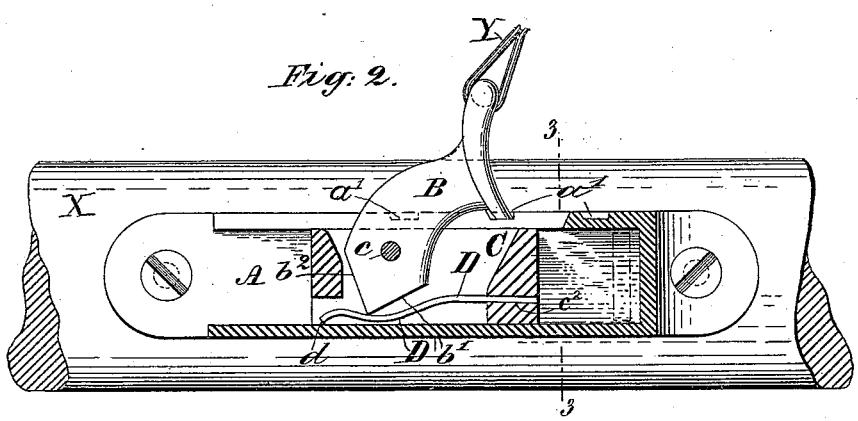
Figure 4:
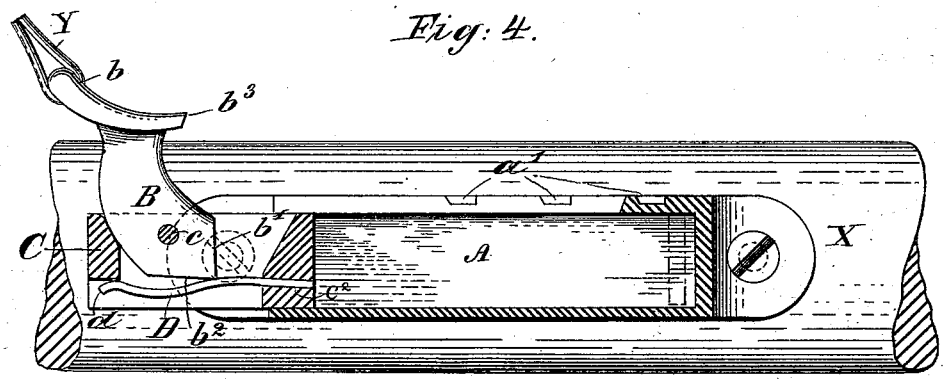
Figure 3:
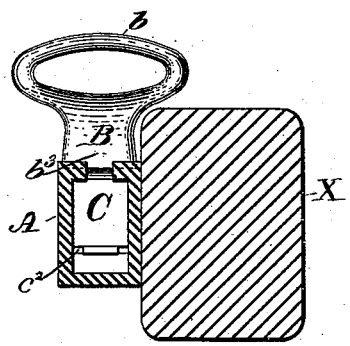

In the drawings which serve to illustrate my invention, Figure 1 is a side elevation of my improved holdback, represented as mounted on the under side of the thill. Fig. 2 is a longitudinal horizontal section of the same, taken substantially in the plane of the lines 2 2 in Figs. 1 and 3. Fig. 3 is a transverse section in the broken plane indicated by the line 3 3 in Fig. 2. Fig. 4 is a view illustrating the operation of the device.

X represents a part of the thill, on the under side of which is secured a box-like thill-casing A, provided with an open-ended slot $a$, which extends from the front end of the casing nearly to the rear end of same.

Y is the breeching-strap of the harness, which is secured at one end to a strap-loop $b$ in the free end of a dog B, which projects out from the hollow of the casing through the slot $a$. This dog B is pivotally mounted at $c$ (see Fig. 2) in a slide-block C, which is adapted to slide longitudinally within the hollow slideway of the casing A, the neck of the dog B playing along the slot $a$. The dog has at its heel or inner end two faces $b'$ and $b^2$, inclined with respect to each other, one or the other of which is pressed upon by a back spring D in the block C, which serves to hold and sustain the dog in either of its two positions with considerable firmness, but yet yields sufficiently to permit the dog to be turned about its pivot $c$. Fig. 2 shows the dog in one of its positions, and Fig. 4 shows it in the other position. The dog is provided with a pawl $b^3$, which faces in the direction of the strain when the horse is backing and the breeching is under strain, and this pawl engages the teeth on a ratchet $a'$, formed on the face of the casing A at one or both sides of the slot $a$ therein. When the dog is turned over so as to cause the pawl-blade to engage the ratchet, the spring D acts with sufficient force on the face $b'$ to hold said pawl firmly in engagment with the ratchet-teeth and to lock the block C and dog B quite firmly to the casing A, thus preventing any shifting or rattling, and the engagement of the pawl with said teeth effectually resists the strain from the breeching-strap. The casing A being fixed in position on the thill, it is only necessary to shift the block C so as to cause the pawl to disengage the ratchet thereon at different points in order to slacken or tighten the breeching to suit the circumstances.

There will be of course a holdback device at each thill, as usual, but as they will be alike, except in respect of being rights and lefts, I have only described one.

When the horse is unharnessed and detached from the thills, the strain on the dog B is reversed and it turns about its pivot $c$, and as the horse is led out the block C will slide out of the casing A at the open front end thereof, as seen in Fig. 4, remaining, however, attached to the breeching-strap through the medium of the dog B.

The strip D may be made of a strip of spring metal having one of its ends secured in a recess formed in the block at $c^2$ and is preferably formed, as shown in Fig. 2, with a lip $d$ at its free end. In this position the block C and casing A are locked quite firmly together through the medium of the dog and of the lip $d$, which is pressed against the side of the thill-casing, thereby preventing the swaying of the breeching-strap from shifting the block. When the dog is turned from this position to that seen in Fig. 4, the first result of the movement is an increased pressure of the lip $d$ against the thill-casing, thereby locking the block C securely against sliding until the dog has passed the center, when the spring D completes the movement of the dog and at the same time withdraws the lip from contact with the casing. The block may then be easily drawn out and is in position for ready replacement. It will be observed that the spring D is under very little tension in this position, in which it remains while the device is not in use, and its durablity is thereby increased. The spring bearing-face $b^2$ on the inner end of the dog is not absolutely essential, as it is not necessary to the proper working of my holdback that the dog shall be very firmly held when turned back, as represented in Fig. 4. I prefer to employ it, however, as it holds the dog back while the block is being inserted.

My holdback would also operate effectively without the ratchet $a'$, the pressure of the pawl or face of the dog on the face of the thill-casing being sufficient to prevent the block C from shifting or rattling, especially if the pawl be made to engage a single recess in the casing corresponding to the recess between two of the ratchet-teeth; but with this construction the breeching-strap could not be taken or slackened, and the full utility of the device could not be obtained.

Having thus described my invention, I claim—

1. The combination, with the open-slotted thill-casing, of a block adapted to slide in the hollow slideway in said casing, a dog pivotally mounted in said block and provided with a strap-loop at its free end and a spring-bearing face at its inner end, and a back spring in said block which bears on said face and holds the dog and block firmly in position in the casing, substantially as set forth.

2. The combination, with the open-slotted thill-casing provided with a ratchet, of a block adapted to slide in the hollow slideway in said casing, a dog pivotally mounted in said block and provided with a strap-loop and a pawl at its free end, the former for attachment to the breeching-strap and the latter to engage said ratchet, and a back spring in said block and bearing on the dog, whereby the pawl on the latter is held in engagement with said ratchet, substantially as and for the purpose set forth.

In witness whereof I have hereunto signed my name in the presence of two subscribing witnesses.

WILLIAM DUNN.

Witnesses:
   HENRY CONNETT,
   PETER A. ROSS.